(12) United States Patent
Dhere et al.

(10) Patent No.: US 10,547,272 B2
(45) Date of Patent: Jan. 28, 2020

(54) DEVICE FOR MEASURING LEAKAGE CURRENT AND AGING OF A PHOTOVOLTAIC MODULE

(71) Applicant: Episolar, Inc., Bolingbrook, IL (US)

(72) Inventors: Neelkanth G. Dhere, Merritt Island, FL (US); Ramesh G. Dhere, Lakewood, CO (US); Narendra S. Shiradkar, Orlando, FL (US); Eric Schneller, Sebastian, FL (US)

(73) Assignee: Episolar, Inc., Bolingbrook, IL (US)

( * ) Notice: Subject to any disclaimer, the term of this patent is extended or adjusted under 35 U.S.C. 154(b) by 992 days.

(21) Appl. No.: 14/491,057

(22) Filed: Sep. 19, 2014

(65) Prior Publication Data

US 2015/0101650 A1    Apr. 16, 2015

Related U.S. Application Data

(60) Provisional application No. 61/879,871, filed on Sep. 19, 2013.

(51) Int. Cl.
*H02S 50/10* (2014.01)
(52) U.S. Cl.
CPC .................. *H02S 50/10* (2014.12)
(58) Field of Classification Search
CPC ........ H02S 50/10; G01R 31/40; G01R 31/025
See application file for complete search history.

(56) References Cited

U.S. PATENT DOCUMENTS

| | | | |
|---|---|---|---|
| 2009/0256581 A1* | 10/2009 | Lu | H01L 21/67253 324/715 |
| 2011/0012635 A1 | 1/2011 | Lu et al. | |
| 2012/0028381 A1* | 2/2012 | Tachibana | G01R 31/2605 438/17 |
| 2012/0043989 A1* | 2/2012 | Shingai | H02S 50/10 324/761.01 |
| 2014/0132302 A1* | 5/2014 | Nagel | G01R 31/129 324/761.01 |

FOREIGN PATENT DOCUMENTS

WO    2012168250 A1    12/2012

* cited by examiner

*Primary Examiner* — Melissa J Koval
*Assistant Examiner* — Courtney G McDonnough
(74) *Attorney, Agent, or Firm* — Erickson Law Group, PC

(57) ABSTRACT

A diagnostic device (40) having layers (25, 27, 29) corresponding to respective layers (24, 26, 28) of a given photovoltaic module (20). The diagnostic device is provided for testing and monitoring a condition of the given photovoltaic module. The layers of the diagnostic device may be made of respective materials with the same or substantially the same electrical resistance and aging characteristics as the respective layers of the given photovoltaic module under operational conditions. Electrodes (42, 44, 50A-C, 52A-C, 54A-C) of the diagnostic device are configured to independently measure electrical resistance along at least two different current resistance paths in the diagnostic device corresponding to respectively different current leakage paths (R1, R'1, R2-4, R5, R5) of the given photovoltaic module.

21 Claims, 4 Drawing Sheets

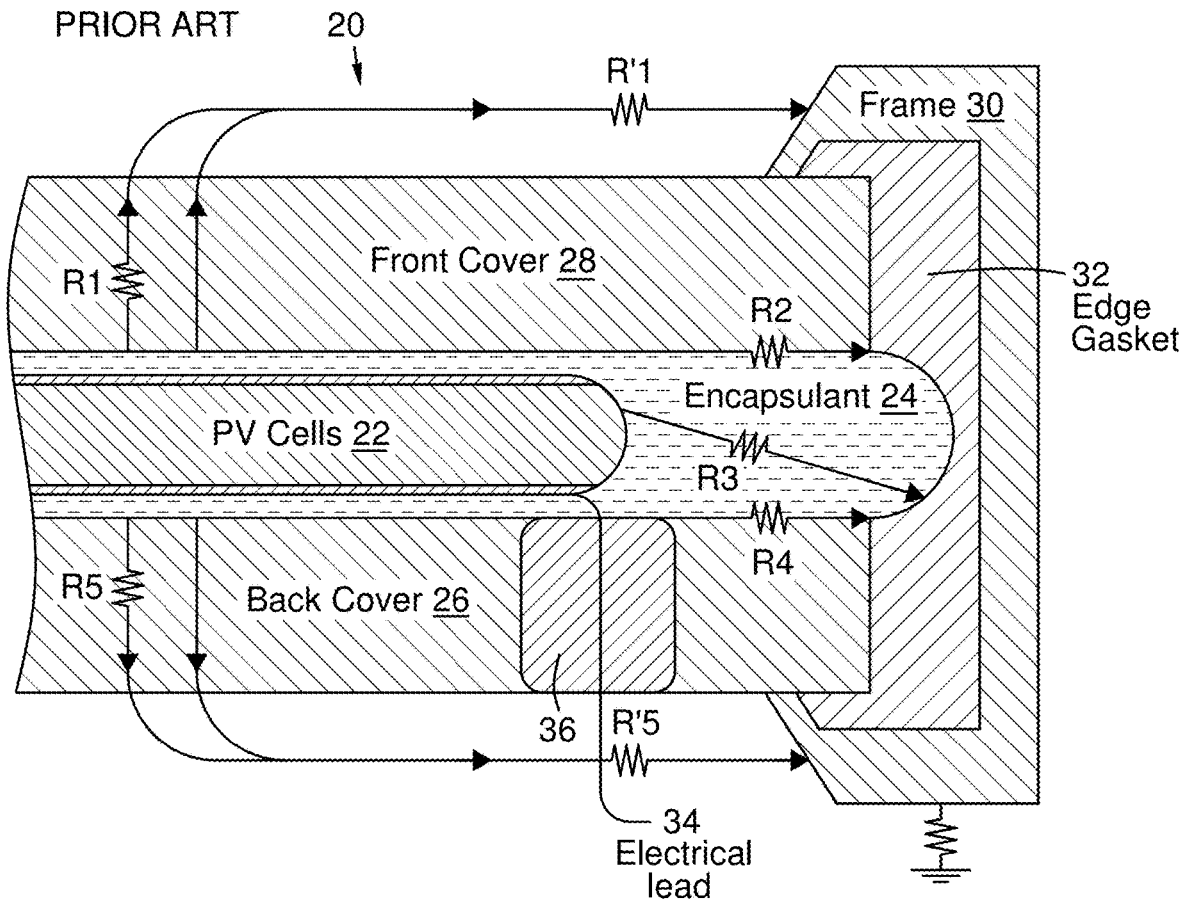

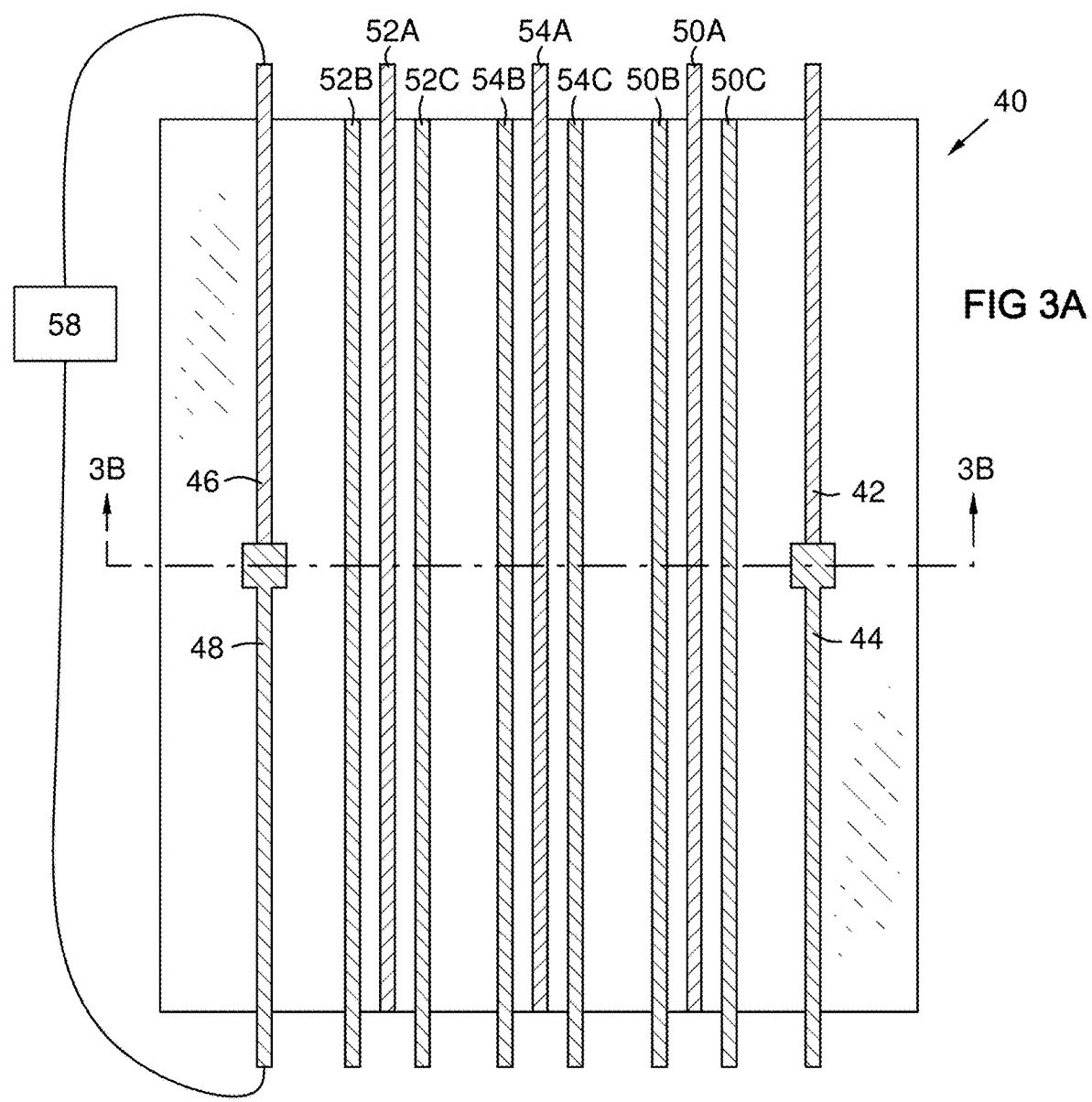
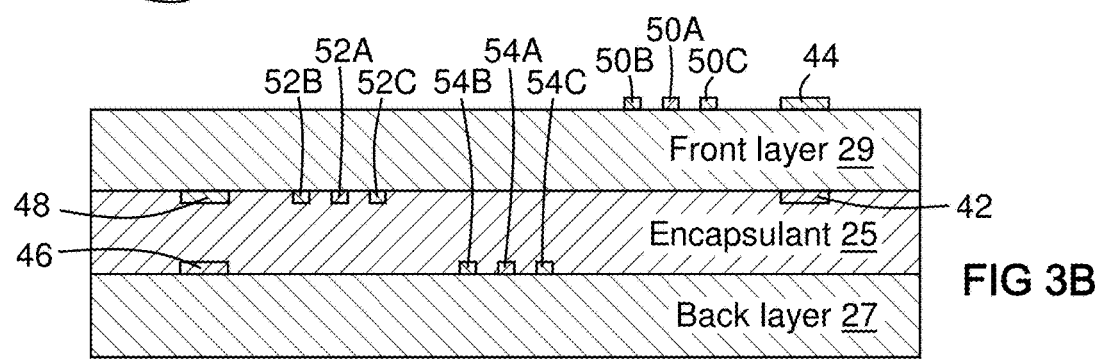
FIG 3A
FIG 3B

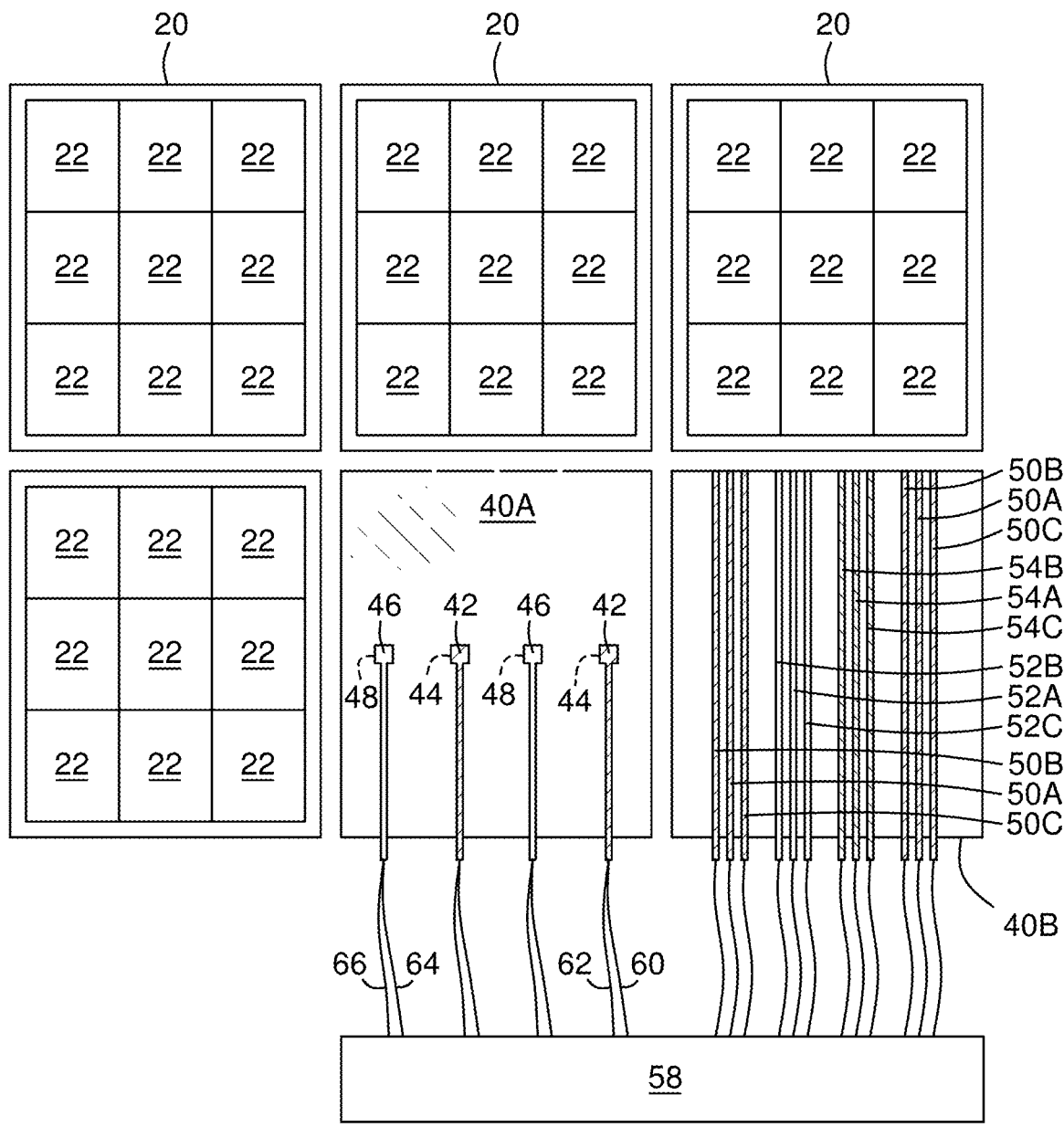

DEVICE FOR MEASURING LEAKAGE CURRENT AND AGING OF A PHOTOVOLTAIC MODULE

This application claims benefit of U.S. Provisional Patent Application 61/879,871, filed Sep. 19, 2013, which is incorporated by reference herein.

FIELD OF THE INVENTION

This invention relates to testing and maintenance of photovoltaic modules, and particularly to measurement of degradation over time by testing electrical resistance at multiple locations and in different elements of the module over time.

BACKGROUND OF THE INVENTION

When performing accelerated lifetime testing of photovoltaic (PV) modules, one important degradation mode to consider is System Voltage Induced Degradation (SVID), also known in the art as Potential Induced Degradation (PID). SVID is a phenomenon that occurs when the cell circuits of the PV modules, such as the PV modules located towards the end of a string, may be at a relatively high potential difference relative to the frame of the module. This can lead to formation of a strong potential field within the module and concomitant generation of leakage currents through the module packaging materials. The extent of this leakage current is an important parameter to monitor as it is often an indicator of the extent of SVID.

SVID affects PV modules to varying degrees depending on the type and design of solar cells and the PV module packaging materials, which include the front cover, encapsulant and back cover of the PV module. The kinetics of degradation is generally driven by environmental conditions, such as temperature, relative humidity, moisture content. SVID is a long-term degradation mode, and presently there is no International Electrotechnical Commission (IEC) test that can evaluate the long-term performance of PV modules as it relates to SVID.

Certain known techniques have attempted to study SVID in PV modules, either in a controlled environment inside a chamber; or in the field by applying a voltage between the cell circuit and the frame of the module. The amount of leakage current flowing through a given PV module would be in direct correlation with the extent of SVID observed in the given PV module.

The present inventors have recognized certain limitations in connection with known techniques, which attempt to characterize SVID in PV modules by measuring the total leakage current flowing from the cell circuit to the frame of the module. Accordingly, such techniques can only be used to measure the lumped insulation resistance of a PV module as a whole, as a function of time. Therefore, one basic limitation in connection with such known techniques is that it is difficult, if not altogether unfeasible, to determine the individual contributions of the leakage currents throughout different leakage paths formed in the various materials, surfaces and/or interfaces in a PV module.

BRIEF DESCRIPTION OF THE DRAWINGS

The invention is explained in the following description in view of the drawings that show:

FIG. 1 is a side sectional schematic view of a prior art photovoltaic module.

FIG. 3A is a front transparent view of the embodiment of FIG. 2A showing aspects of voltage potentials of the electrodes.

FIG. 3B is a side sectional view taken along line 3B-3B of FIG. 3A.

FIG. 4 is a front view of a photovoltaic module array with two diagnostic devices in which each device has a different electrode configuration in an embodiment of the invention.

DETAILED DESCRIPTION OF THE INVENTION

Figure 2A:
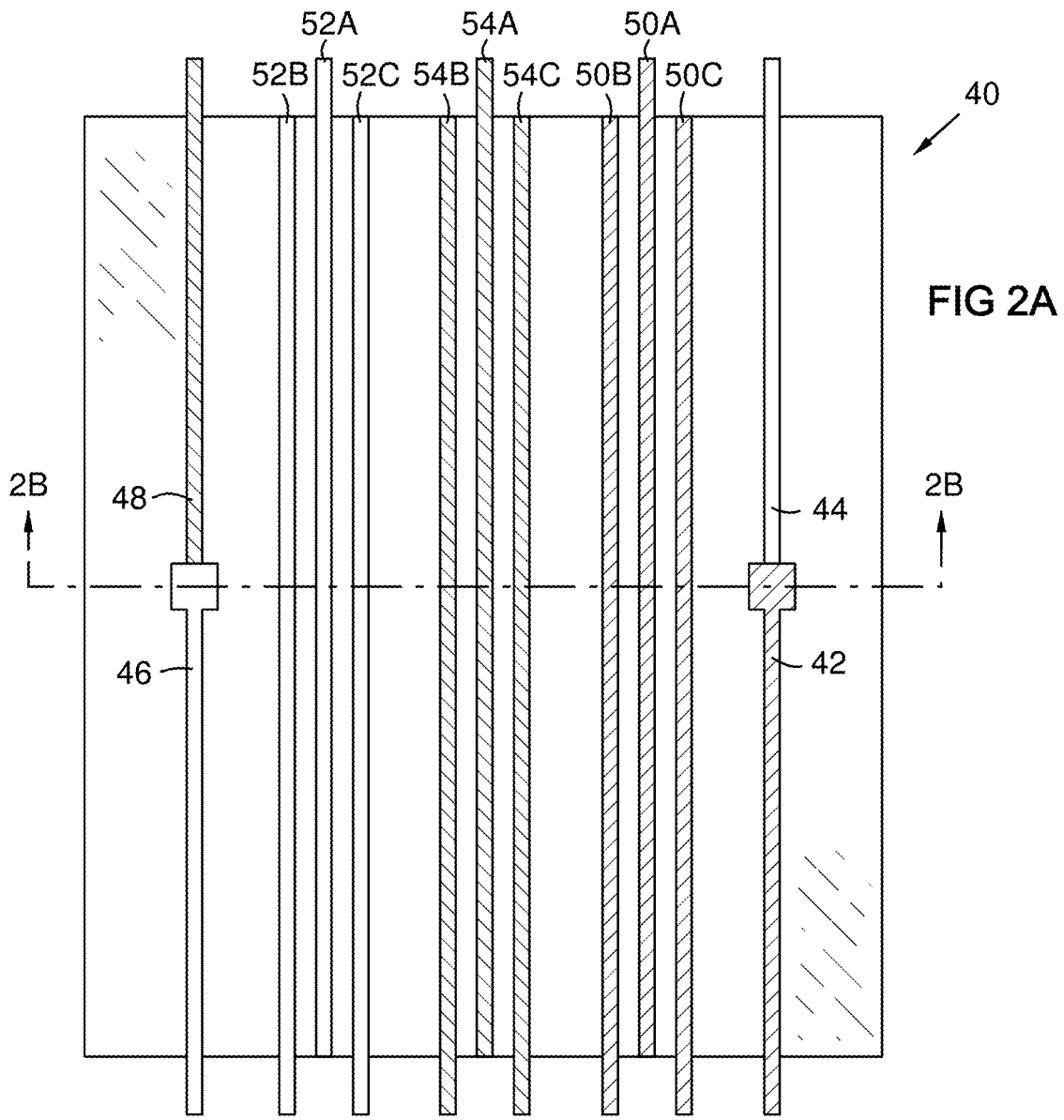
FIG. 2A is a front transparent view of an embodiment of the invention showing aspects of electrode configurations therein.

In view of the prior art limitations, the present inventors propose an innovative solution, which, in one non-limiting embodiment, may comprise a diagnostic device arranged to independently measure, as a function of time, the respective electrical resistances of various electrically-conductive pathways which may be formed in a photovoltaic (PV) module, such as without limitation may correspond to the bulk encapsulant, front cover, front cover-encapsulant interface, back cover-encapsulant interface and/or surface of the front cover in a PV module.

FIG. 1 illustrates a photovoltaic module 20 with one or more photovoltaic cells 22, in an encapsulant 24 between a back cover 26 and a front cover 28. These elements may be peripherally surrounded by a frame 30 with an edge gasket 32. An electrical lead 34 extends externally from the PV cells 22 via a potting plug 36 in the back cover 26. As schematically shown in FIG. 1, the total leakage current in a typical PV module is formed of a plurality of leakage currents flowing through different exemplary pathways R1, R'1, R2-4, R5, and R'5. Although measurement of the total leakage current has been possible, until the present invention it was not feasible to determine the individual leakage current contributions from each individual pathway. In accordance with aspects of the present invention, the present inventors propose a device that effectively and reliably can determine the individual contributions of leakage current from practically every leakage current pathway within a PV module.

In one non-limiting embodiment, the inventive device may comprise one or more groups of electrodes placed at a plurality of locations arranged to acquire respective individual measurements indicative of leakage currents through the various pathways within a PV module. The inventive device may comprise respective layers (e.g., laminates) configured to be structurally similar to a PV module that may comprise a front cover, encapsulant, and back cover. That is, such layers may be constructed to mimic or simulate the structure of a PV module. For example, the materials used in the device may be chosen to duplicate the materials of a given PV module which is being studied. The layers of the inventive device may be made of respective materials having the same or substantially the same electrical resistance and aging characteristics as corresponding layers of a given photovoltaic module under operational conditions over time. The inventive device may use the same materials as the given photovoltaic module, and/or other materials that provide the above simulation characteristics.

FIGS. 2A-3B illustrate non-limiting structural and/or operational aspects of one embodiment of the inventive device, such as non-limiting examples of placement and configuration of the electrode groups. The electrodes can be in the form of electrically-conductive metallic sheets, plates, ribbons or coatings. The dimensions, geometrical configuration and arrangement of the electrodes may be adjusted as desired to optimize performance and/or accommodate for practical considerations. It will be appreciated that any dimensions and/or electrode interspacing, etc., depicted in such figures should be construed in an example sense and not in a limiting sense regarding aspects of the present invention.

Figure 2B:
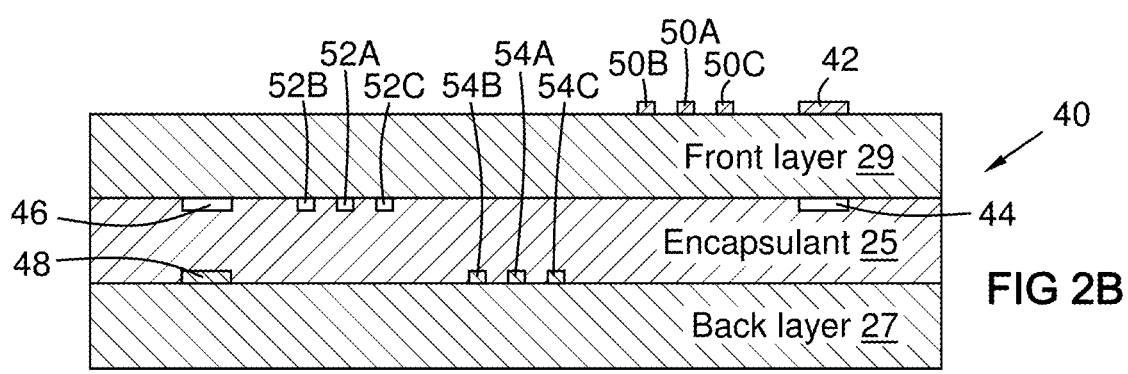
FIG. 2B is a side sectional view taken along line 2B-2B of FIG. 2A.

FIG. 2A is a transparent front view of an embodiment of the invention. FIG. 2B is a sectional side view taken along line 2B-2B of FIG. 2A. These figures show a diagnostic device 40 with layers 25, 27, 29 that mimic or simulate three corresponding layers 24, 26, 28 of a given photovoltaic module (FIG. 1) to be tested. The layers of the diagnostic device may include an encapsulant layer 25 between a back layer 27 and a front layer 29. Each layer 25, 27, 29 of the diagnostic device may be made of a material with the same or substantially the same electrical resistance and aging characteristics as the corresponding layer 24, 26, 28 of the given photovoltaic module 20 under operational conditions. Electrodes 42, 44, 46, 48 50A-C, 52A-C, 54A-C of the diagnostic device are configured to independently measure electrical resistance along at least portions of two different current resistance paths of the diagnostic device corresponding to respective different current leakage paths R1, R'1, R2-4, R5, R'5 of the given photovoltaic module. The electrodes of the diagnostic device 40 may be configured in a plurality of electrode groups exemplified by 42/44, 46/48 50A-C, 52A-C, 54A-C, in which each electrode group comprises at least two electrodes separated by at least a portion of one of the different electrical resistance paths of the diagnostic device.

For example, electrodes 42 and 44 may be disposed on respective front and back surfaces of the front layer 29. Electrodes 46 and 48 may be disposed on respective front and back surfaces of the encapsulant layer 25. Electrodes 50A-C may be disposed on a front surface of the front layer 29. Electrodes 52A-C may be disposed in or on an interface between the front layer 29 and the encapsulant layer 25. Electrodes 54A-C may be disposed in or on an interface between the encapsulant layer 25 and the back layer 27. A group of electrodes includes two or more separated electrodes for measuring a portion or area of a given electrical resistance path of the diagnostic device 40. In one embodiment, an electrode group may include a triple of electrodes in which a center electrode 50A expresses a different electrical potential than the two outer electrodes 50B, 50C of the triple. The triple electrode arrangement has the benefit over a simple pair two separated electrodes per group by shielding against stray currents that may increase the measurement error.

The inventive device enables resistance measurements indicative of practically every leakage current pathway in a practical PV module. The electrode architecture (e.g., electrode groups) may be configured to acquire resistive measurements that simulate resistance in internal interfaces and bulk pathways in a given PV module. For example, sheet resistances at the front cover/encapsulant and encapsulant/back cover interfaces and the bulk resistivity of the encapsulant. The electrode architecture may also be configured for measurements of surface sheet resistance and bulk resistivity of the front and/or the back cover in the given PV module.

FIGS. 3A-B show further aspects of the embodiment of FIGS. 2A-B. Each electrode group 42/44, 46/48 50A-C, 52A-C, 54A-C includes at least a first electrode 42, 46, 50A, 52A, 54A provided to express a first voltage provided by a controller 58, and at least a second electrode 44, 48, 50B, 50C, 52B, 52C, 54B, 54C to express a different second voltage or ground. For example, the first voltage may be higher than the second voltage. The controller 58 may include a power supply, electronics for energizing the electrodes, and circuitry for sensing the current flow rate between electrodes of each group. The controller may include or interface to a computer that stores the sensed leakage profiles in memory and analyzes them against new profiles and/or model profiles over time to provide predictive maintenance and replacement schedules. For example, a front surface sheet resistance measurement may indicate a need for cleaning of the front surface of the PV module and the diagnostic device.

In operation, a potential difference is applied between associated electrodes to induce current flow through the desired leakage path. An external voltage source 58 is used to apply the potential difference. In one non-limiting application, voltages of up to approximately 1000 V can be used in the US. Each of the lower-potential electrodes may be electrically connected to current measuring instrumentation in the controller 58. When measuring the interfacial resistance, the electrodes are adjacent, and may be parallel to each other. Using a straightforward relationship between the spacing and parallel length of the electrodes, an accurate measurement of the sheet resistance for each specific interfacial or surface pathway can be made. For bulk resistance, the overlap of associated electrodes creates an active area between them which is effective for resistance measurements. In one non-limiting embodiment, the electrodes may extend beyond the edges of the diagnostic device 40 for convenient external electrical connections between external instrumentation 58 (e.g., voltage source, current measuring instrumentation, etc.) and the device. Using a straightforward relationship between the thickness of the material and the electrode overlap area, an accurate measurement of the bulk resistivity for each specific material can be made.

In one non-limiting embodiment, these measurements may be monitored on a continuous basis with computerized equipment to, for example, establish a correlation between environmental parameters (e.g., temperature, relative humidity, solar irradiance, etc.) and the resistances of specific pathways. Additionally, as water vapor diffuses into the device over a period of time, as it does in an actual PV module, the resistance values may change. These seasonal or time-dependent variations can also be monitored.

FIG. 4 shows an array of photovoltaic modules 20 installed along with two diagnostic devices 40A and 40B in an embodiment of the invention having different arrangements of electrodes in each diagnostic device 40A, 40B to measure resistance on respectively different current resistance paths in the two diagnostic devices 40A, 40B that simulate respectively different current leakage paths in the photovoltaic module 22 selected from the following:

a) an internal interface pathway of the photovoltaic module being mimicked;
b) a surface sheet resistance of a front and/or a back cover of the photovoltaic module being mimicked;
c) a bulk resistivity of an element of the photovoltaic module being mimicked.

For example, in the exemplary diagnostic device 40A as shown, two electrode groups 42/44 and 46/48 are provided to measure bulk resistivity at two different locations for redundancy, self checking, and to determine area variability. The lower electrodes 44 and 48 are hidden under the upper electrodes 42, 44 in this view for convenience of the external connections 60, 62 and 64, 66. In the exemplary diagnostic device 40B as shown, two electrode groups 50A-C are provided at different locations along with other electrode groups 52A-C and 54A-C to measure the condition of the front surface of the front layer of the diagnostic device at two different locations for redundancy, self checking, and to determine area variability.

The various electrode groups may be disposed in a single device, or may be optionally disposed in separate devices, which in combination cooperate to achieve the same results provided by a single device. If desired, an alternative embodiment may also be used to provide similar bulk resistivity and sheet resistance measurement for the back cover, such as a glass back cover. It will be appreciated that this type of measurement may not be needed in the case of a polymer back sheet that usually comprises a very high bulk resistivity.

It will be appreciated that aspects of the present invention are not limited to a device configured to mimic the PV module, such as the device described in the context of FIGS. 2A-3B. For example, it is contemplated that one or more electrode architectures, as illustrated in FIGS. 2A-3B may be integrated or embedded in actual PV modules. For this purpose, the materials, shapes and dimensions may be modified as necessary. This would enable in-situ measurements of the individual leakage currents, not just mimicking the PV module materials and structural arrangements, but with the identical materials and structural arrangements of actual PV modules. The specific geometry and location of the electrodes may be optimized to fit in an appropriate location within the PV module. For example, the electrodes may replace a few cells within a module or additional space could be accommodated to include such electrodes. In one non-limiting application, it is contemplated that one or more (e.g., several) of such integrated PV modules (not necessarily an entire production line of PV modules) may be customized for performing testing representative for the entire PV production line. One practical advantage of this integrated device is that it avoids a need for independent racking or mounting systems for the single or multiple inventive devices.

In operation, the inventive device may be complementary to any reliability testing of PV modules. In one non-limiting application, the inventive device can be placed along with PV modules undergoing accelerated testing in environmental chambers or with PV modules deployed in the field. This may provide detailed information about the exact location of leakage currents within the PV modules and may provide practically instantaneous feedback without destructive testing of the PV modules. For example, this can provide manufactures with valuable insight into the effect of changes in the manufacturing process or PV module materials that may be used for a given PV production line.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A device comprising a first plurality of electrodes arranged in a first structure having a front layer, an intermediate layer and a back layer arranged in a stack and mimicking layers of a photovoltaic module, the first plurality of electrodes being embedded within the stack and having portions exposed outside of the stack for electrical connection to testing apparatus for acquiring measurements indicative of respective leakage current contributions from different current leakage paths of the photovoltaic module being mimicked.

2. The device of claim 1, wherein the first plurality of electrodes comprises electrodes configured to acquire resistive measurements indicative of internal interface and bulk pathways for the photovoltaic module being mimicked.

3. The device of claim 2, further comprising a second plurality of electrodes configured to acquire measurements indicative of surface sheet resistance of a front cover and/or a back cover of the photovoltaic module being mimicked.

4. The device of claim 3, wherein the first plurality of electrodes comprises electrodes configured to enable in part a measurement indicative of bulk resistivity of the front cover and/or the back cover of the photovoltaic module being mimicked.

5. The device of claim 1, disposed proximate the photovoltaic module being mimicked and subject to environmental parameters experienced by the photovoltaic module over a period of time, wherein the measurements indicative of the respective leakage current contributions from the different current leakage paths are monitored over the period of time to establish a correlation between the environmental parameters and the respective leakage current contributions.

6. The device of claim 1, wherein the first plurality of electrodes comprises multiple pairs of electrodes, each pair of electrodes comprising first and second electrodes separated by a current resistance path in the device that correlates to part of one of the different leakage current paths in the photovoltaic module, and electronics for providing respectively different electrical potentials to the first and second electrodes and for measuring a current between them.

7. The device of claim 1, wherein the first plurality of electrodes comprises a triple of electrodes comprising first, second, and third parallel electrodes, wherein the first and second parallel electrodes are separated by a first current resistive path, and the second and third parallel electrodes are separated by a second current resistive path; each current resistive path simulating a respective part of one of the current leakage paths of the photovoltaic module; and further comprising electronics that provide a voltage potential between the first and second parallel electrodes and between the second and third parallel electrodes, wherein the electronics measure a current flow between the second parallel electrode and the first and third parallel electrodes.

8. The device of claim 1, further comprising a third and fourth plurality of electrodes in a second structure mimicking the photovoltaic module, wherein the third and fourth pluralities of electrodes are respectively configured to measure resistances on respectively different current resistance paths in the second structure that simulate respectively different current leakage paths in the photovoltaic module selected from one or more of the following:
   a) an internal interface pathway of the photovoltaic module being mimicked;
   b) a surface sheet resistance of a front and/or a back cover of the photovoltaic module being mimicked;
   c) a bulk resistivity of an element of the photovoltaic module being mimicked.

9. The device of claim 1, wherein the first plurality of electrodes are in the form of linear, electrically conductive ribbons that span substantially across a width of the device.

10. A diagnostic device for testing and monitoring a condition of given photovoltaic module, the diagnostic device comprising:

a first structure comprising a plurality of layers corresponding to respective layers of the given photovoltaic module arranged in a stack;

each layer of the diagnostic device made of a material with the same or substantially the same electrical resistance and aging characteristics as the respective layer of the given photovoltaic module under operational conditions; and a first plurality of electrodes embedded within the stack and configured to independently measure electrical resistance along at least two different electrical resistance paths of the diagnostic device corresponding to respectively different current leakage paths of the given photovoltaic module.

11. The diagnostic device of claim 10, wherein the first plurality of electrodes comprises a plurality of electrode groups, each electrode group comprising at least two electrodes separated by at least a portion of one of the different electrical resistance paths of the diagnostic device.

12. The diagnostic device of claim 10, comprising a second plurality of electrodes and wherein the first and second plurality of electrodes are configured to independently measure an electrical resistance across at least a portion of at least two of the layers of the diagnostic device.

13. The diagnostic device of claim 10, wherein the plurality of layers of the diagnostic device comprises an encapsulant layer sandwiched between a back layer and a front layer.

14. The diagnostic device of claim 13, comprising a second plurality of electrodes, and wherein the second plurality of electrodes comprises: surface electrodes on a front surface of the front layer; and the first plurality of electrodes comprises embedded electrodes on front and back surfaces of the encapsulant layer.

15. The diagnostic device of claim 14, wherein the second plurality of electrodes comprises: at least two separated electrodes on the front surface of the front layer; and the first plurality of electrodes comprises at least two separated electrodes in or on an interface between the front layer and the encapsulant layer; and at least two separated electrodes in or on an interface between the encapsulant layer and the back layer.

16. The diagnostic device of claim 13, comprising a second plurality of electrodes, and wherein the second plurality of electrodes comprises a first group of at least two separated surface electrodes on a front surface of the front layer;

and the first plurality of electrodes comprises a second group of at least two separated embedded electrodes in or on an interface between the front layer and the encapsulant layer; and a third group of at least two separated electrodes in or on an interface between the encapsulated layer and the back layer.

17. The diagnostic device of claim 16, wherein each of the first and second groups comprise three parallel electrodes, wherein a center one of the three parallel electrodes expresses a voltage potential difference relative to each of the other two parallel electrodes of the group.

18. The diagnostic device of claim 10, wherein each layer of the diagnostic device is made of the same material as the respective layer of the given photovoltaic module.

19. The diagnostic device of claim 10 formed by adding the first plurality of electrodes to the given photovoltaic module during fabrication of the given photovoltaic module.

20. A photovoltaic module comprising a plurality of layers arranged in a stack and electrodes embedded in the stack and having portions exposed outside of the stack for electrical connection to testing apparatus for acquiring measurements indicative of respective leakage current contributions from different current paths in the photovoltaic module.

21. The photovoltaic module of claim 20, wherein the first plurality of electrodes are in the form of linear, electrically conductive ribbons that span substantially across a width of the module.

* * * * *